United States Patent [19]

Ahrens

[11] 4,269,144
[45] May 26, 1981

[54] SWINE FARROWING HUT AND METHOD OF FARROWING PIGS AND MAINTAINING A DISEASE-FREE FARROWING HUT

[76] Inventor: Claude W. Ahrens, R.R. 3, Grinnell, Iowa 50112

[21] Appl. No.: 945,084

[22] Filed: Sep. 25, 1978

[51] Int. Cl.³ .............................................. A01K 1/02
[52] U.S. Cl. ...................................................... 119/16
[58] Field of Search ........................ 119/15, 16, 19, 20

[56] References Cited

U.S. PATENT DOCUMENTS

| | | | |
|---|---|---|---|
| 920,975 | 5/1909 | Minion | 119/19 |
| 1,230,237 | 6/1917 | Sturm | 119/16 |
| 1,439,157 | 12/1922 | Ford | 119/16 |
| 1,875,433 | 9/1932 | Fitzpatrick | 119/16 |
| 2,602,419 | 7/1952 | Johnson | 119/16 |
| 3,237,600 | 3/1966 | Behrens et al. | 119/20 |
| 3,584,603 | 6/1971 | Rutherford | 119/16 |
| 3,762,372 | 10/1973 | Mente et al. | 119/16 |
| 3,995,592 | 12/1976 | Goldstaub et al. | 119/16 |

FOREIGN PATENT DOCUMENTS

| | | | |
|---|---|---|---|
| 1141083 | 3/1918 | United Kingdom | 119/19 |
| 377893 | 8/1932 | United Kingdom | 119/19 |

Primary Examiner—Gene Mancene
Assistant Examiner—Robert P. Swiatek
Attorney, Agent, or Firm—Zarley, McKee, Thomte, Voorhees & Sease

[57] ABSTRACT

A farrowing hut structure of non-porous fiber-glass material is pivotally connected at one of its ends to one end of a fiber-glass floor for being pivoted between lowered and raised positions with the floor and interior of the hut structure being fully exposed to the sun and atmosphere when the hut is in its raised upended position. The hut is divided into a center sow section with pig sections on opposite sides and the floor includes heating elements embedded therein for heating the pig sections. An open top pen enclosure is connected to the hut enclosure at the end opposite the end pivotally connected to the floor. The pen floor and the hut structure in one embodiment is formed from fiber glass while in a second embodiment, the pen floor is concrete and is connected to a waste gutter which receives waste products from the hut structure and pen enclosure due to the hut structure and pen enclosure being placed on an incline sloping toward the waste gutter. A pig feeder may be placed on either end door in the center sow section or in the pig sections on an exterior wall in the proximity of a feed and pig access door for filling the feeder and removing pigs.

9 Claims, 9 Drawing Figures

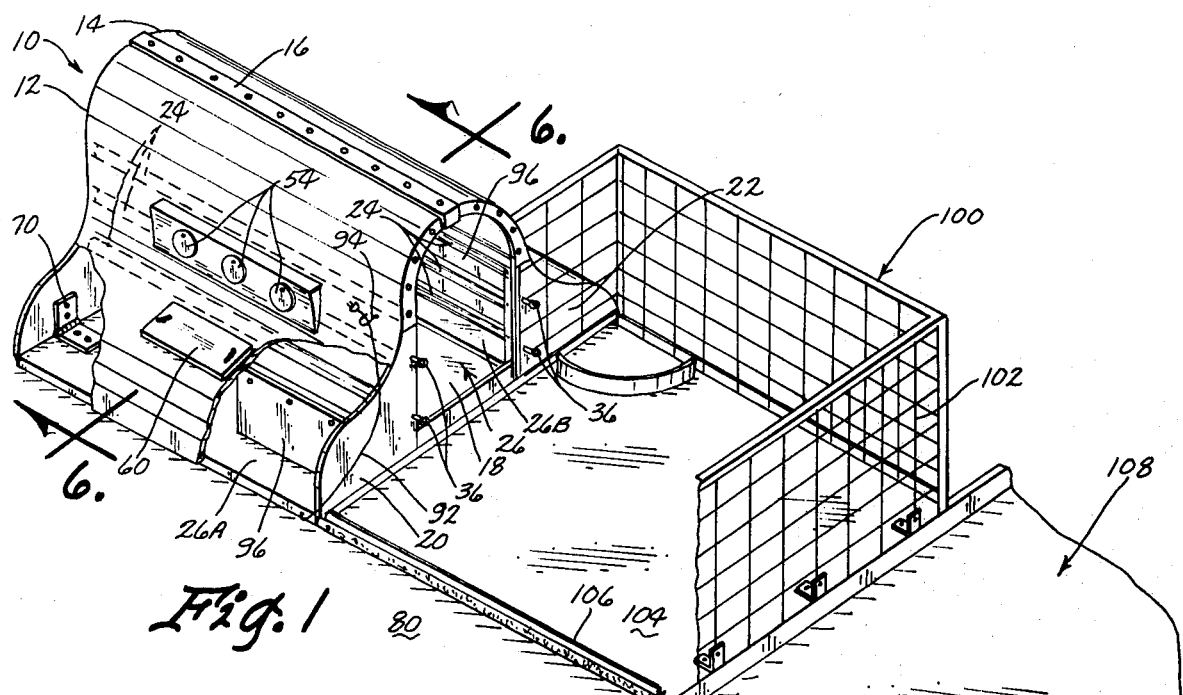
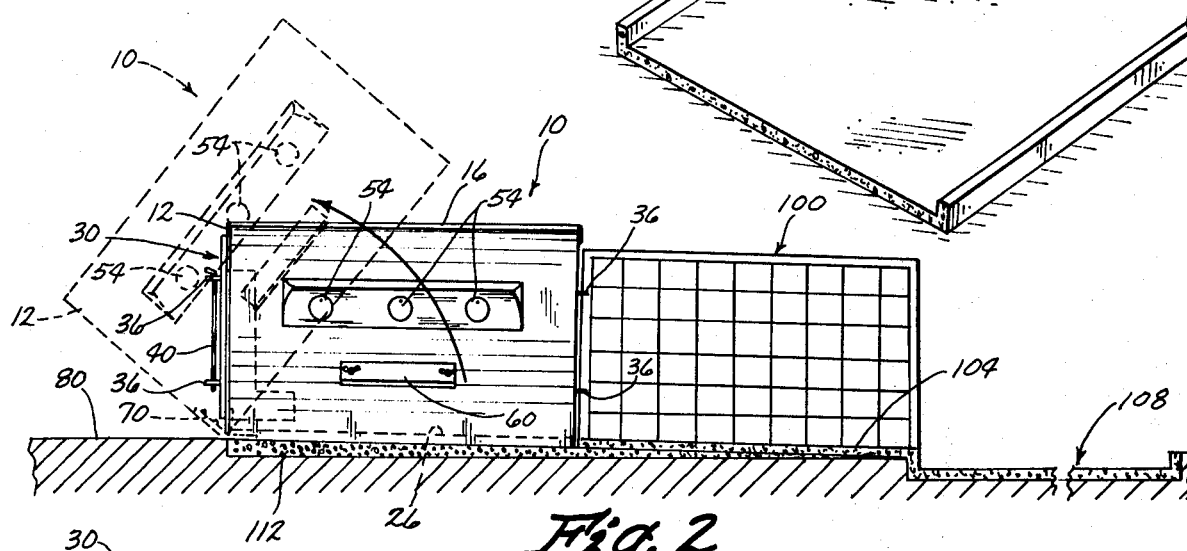
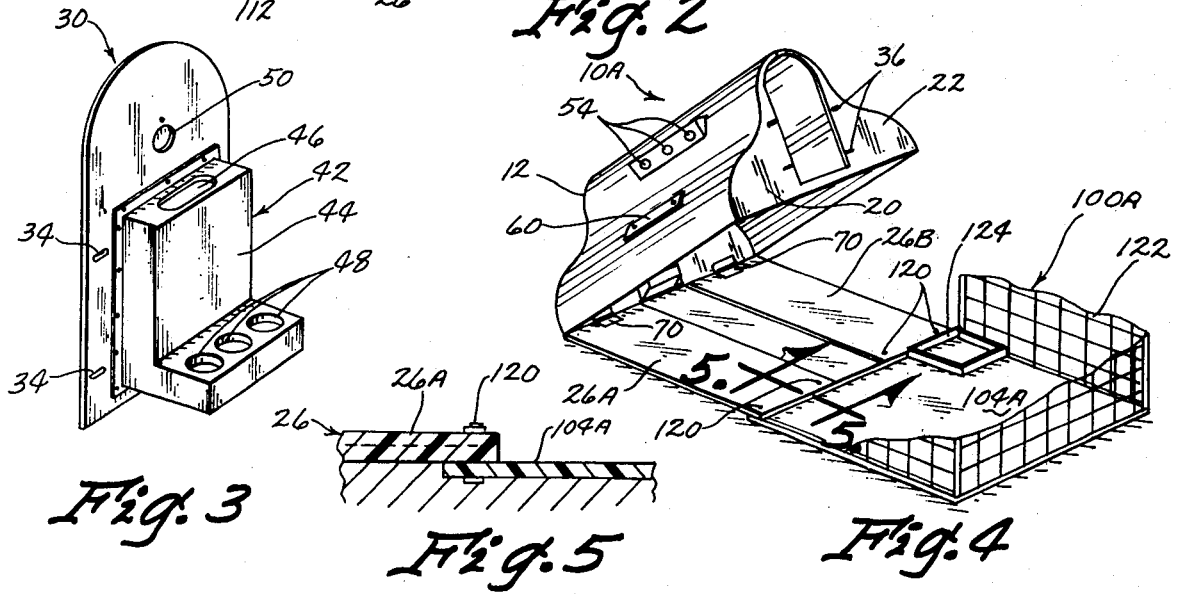

SWINE FARROWING HUT AND METHOD OF FARROWING PIGS AND MAINTAINING A DISEASE-FREE FARROWING HUT

BACKGROUND OF THE INVENTION

Multifarrowing unit structures suffer from disease problems since cleaning is difficult and the killing of all bacteria uncertain due to the interior of the structure being shielded from the sun's direct ultraviolet rays which would kill all bacteria.

Disease is spread by the bacteria penetrating the wood or concrete material of the floors and being retained there indefinitely thereby exposing each litter that uses the same area. There is no effective way to remove all of the bacteria since it usually penetrates too deeply into the concrete or wood material. Also, animals housed in a common building necessarily breath the same air and if disease is present in the building it will be spread to all animals breathing the common air.

The large farrowing structures also lack the ability to be moved about which is necessary for maintaining farrowing structures on fresh ground at all times.

A problem with outdoor farrowing units has also been the difficulty of cleaning these units and keeping them free of disease-spreading bacteria. Furthermore, these outdoor units are unusable in cold weather since small pigs cannot endure the colder weather.

Accordingly, a farrowing enclosure is needed that is simple in construction, easy to clean and be moved about thereby assuring the sow and pigs that they will have a clean disease-free fresh air environment.

SUMMARY OF THE INVENTION

The farrowing hut of this invention meets all objectives by being easily cleaned by tilting the hut structure to an upended position on the ground off the floor to which the structure is pivotally connected. The sun through its ultraviolet rays kills all bacteria inside the fully exposed interior of the hut structure and the floor.

The entire structure including the floor is made from a non-porous fiberglass material which bacteria cannot penetrate as is the case with wood or concrete. Accordingly, when the floor and the interior are washed out with water and then exposed to the rays of the sun the bacteria will all be killed. Any disease one litter may have will be eradicated at this time and will not be passed on to the next sow and her litter. Since the litters are outside and separated they will not be breathing the same air thereby eliminating any possibility of disease being spread should any single litter be infected.

The hut structure can be used year around even through the coldest winters by using the heating elements in the pig sections wherein the heating elements are embedded in the fiberglass floor thereby keeping the pig sections as warm as desired for a minimum of cost.

The hut enclosure is connected to a pen enclosure and an end door may be provided at either end of the hut structure and may include on the inside face a pig feeder or the pig feeder may be placed in the pig sections on the exterior wall where feed will only be accessible to the pigs and not the sow. An access opening in the exterior wall allows feed to be placed in the feeder from the outside.

A waste gutter may be provided on the opposite end of the pen enclosure from the hut structure with the hut structure and pen having floors which slope toward the waste gutter thereby allowing waste materials to be moved by gravitational forces to the waste gutter. The floor of the pen enclosure and the waste gutter may be of concrete or fiberglass material just as the hut structure is constructed.

Wind is kept from the pigs in the pig sections of the hut structure by vertically disposed wind guards running a portion of the length adjacent the open end wall passageways. The sow and the pigs in the oppositely disposed pig sections are maintained apart by longitudinally extending retaining bars which allow the pigs to move about thereunder but restrain the sow from entering the pig sections.

BRIEF DESCRIPTION OF THE DRAWINGS

FIG. 1 is a fragmentary perspective view of the farrowing hut, pen enclosure, and waste gutter.

FIG. 2 is a reduced in scale side elevational view showing the hut structure being pivoted in a dashline position.

FIG. 3 is a perspective view of an end door including a pig feeder unit attached thereto.

FIG. 4 is a reduced in scale perspective view of an alternate embodiment wherein the pen floor is fabricated from fiberglass and is bolted to and under the hut floor.

FIG. 5 is a cross-sectional view taken along line 5—5 in FIG. 4.

DESCRIPTION OF THE PREFERRED EMBODIMENT

Figure 6:
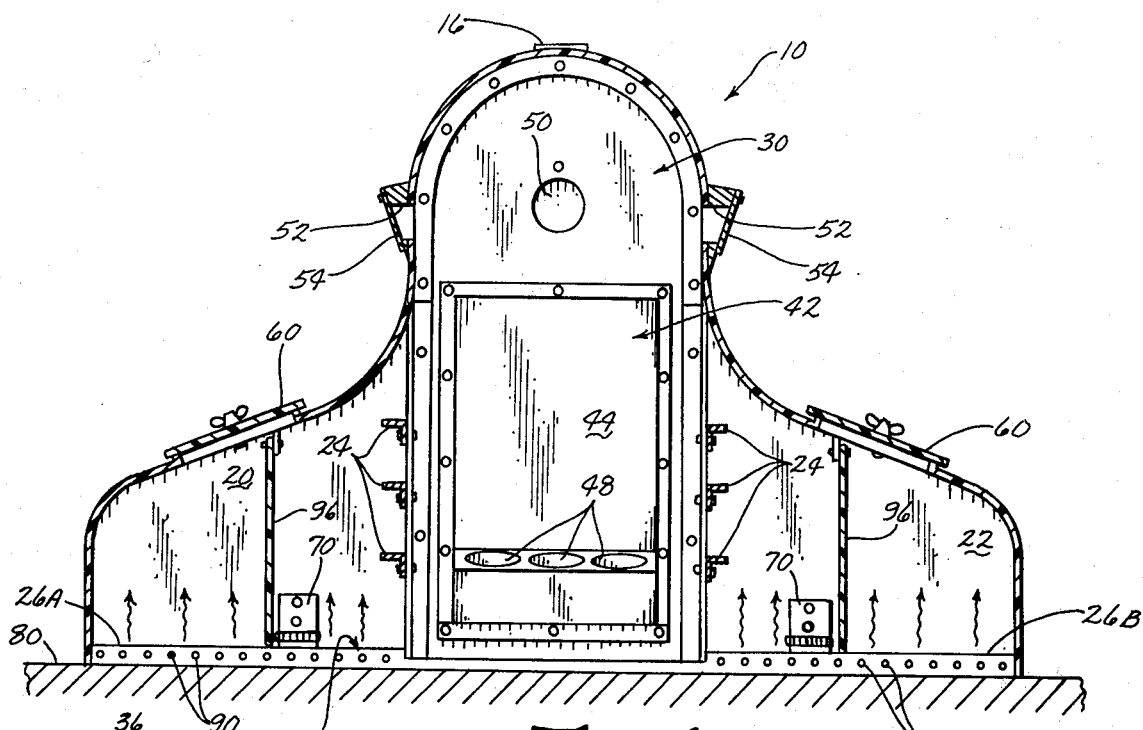
FIG. 6 is a cross-sectional view taken along line 6—6 in FIG. 1.

The hut structure of this invention is referred to generally in FIG. 1 by the reference numeral 10 and includes two half sections 12 and 14 molded of fiberglass material and interconnected along the top by connecting straps 16. The hut structure provides a sow section 18 flanked by oppositely disposed pig sections 20 and 22.

The center sow section 18 extends laterally to the vertically disposed wall of angle iron retaining bars 24 with the bottom retaining bar being spaced high enough above the floor 26 to allow a pig to move thereunder so that it may travel freely from the pig sections 20 and 22 into the sow section 18.

Figure 8:
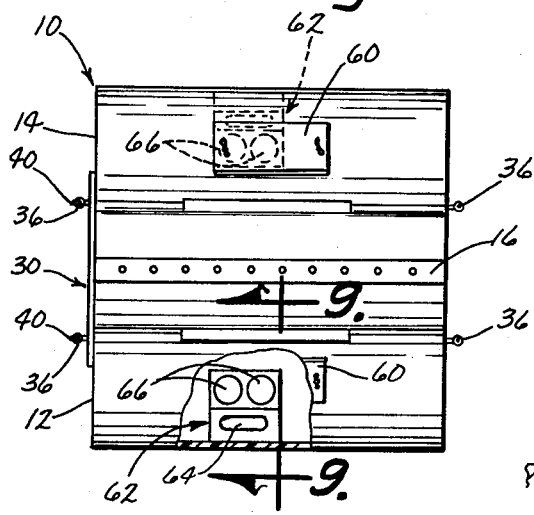
FIG. 8 is a fragmentary reduced in scale top plan view of the hut only.

The ends of the hut 10 are open but may be closed by end doors 30 such as seen in FIG. 3, and in FIG. 8. The end door 30 is secured in place by eye bolts 36 extending through aligned openings 34 on the end door 30 followed by locking rods 40 extending through the eye bolts 36.

A pig feeder unit 42 may be secured to the inside face of the indoor 30, as seen in FIG. 3 and includes a feed storage compartment 44 having a fill hole 46 at the top with feeder holes 48 at the bottom. The feed unit may be filled by removal of the end door or through an air circulation opening 50 directly above the filler hole 46.

Additional air circulation holes 52 are provided on opposite sides of the hut structure and are closable by covers 54.

Figure 9:
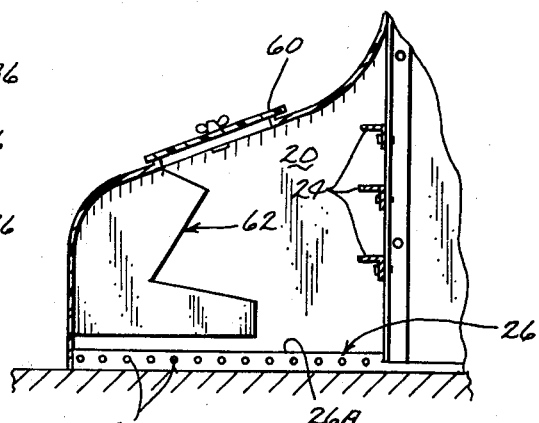
FIG. 9 is a cross-sectional view taken along line 9—9 in FIG. 8, and showing the pig feeder units mounted on the exterior wall in the pig sections.

An access cover 60 is provided on each side directly over the pig compartments 20 and 22 centrally thereof whereby pigs may be placed in the pig compartments or removed therefrom or feed may be placed in an exterior wall mounted pig feeder 62 (FIG. 9) having a fill opening 64 directly below the cover 60. Feed holes 66 (FIG. 8) are accessible only from within the pig compartments or sections.

Figure 7:
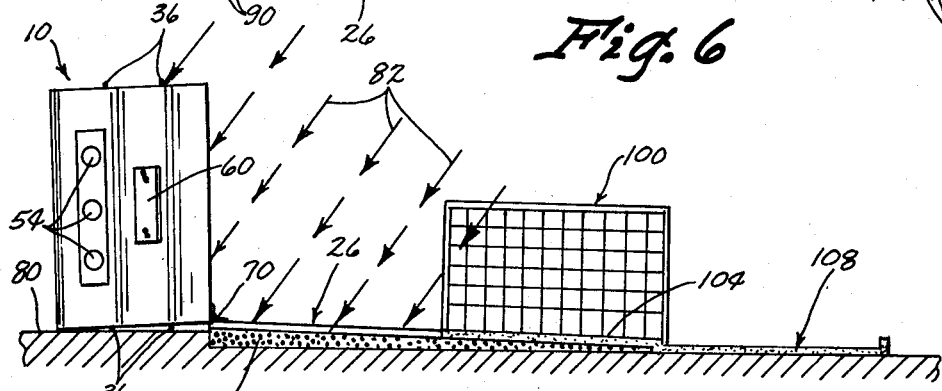
FIG. 7 is a reduced in scale side elevational view showing the hut structure in its fully open position with the hut being upended on the ground adjacent the hut floor.

The cleaning of the hut structure is easily accomplished by virtue of the fact that the hut structure 10 is pivotally connected by hinges 70 to the floor 26 such that, as seen in FIG. 2, the hut 10 may be pivoted towards an upended position off of the floor 26 where, as seen in FIG. 7, an end wall is resting on the ground 80 fully exposing the interior of the hut structure and the floor 26 to the rays 82 of the sun and additionally allowing air circulation throughout. The hut structure being fabricated from lightweight fiberglass is easily tipped up to the cleaning position of FIG. 7.

The hut structure is an all-year-round farrowing unit due to the inclusion of heating elements 90 in the floor portions 26A and 26B in the pig sections 20 and 22. An electrical cord 92 may be conveniently connected to an exterior electrical power source and when not in use may be held on the exterior of the structure by a hook 94.

The pigs in the pig compartments 20 and 22 are protected from wind entering the sow center section 18 by wind guards 96 hanging from the top wall over the pig sections. The guards 96 are flexible and made of rubber material and extend approximately a quarter of the length of the hut structure in the area of the open ends which will allow air to enter. The pigs may move under the wind guards or around the end.

As seen in FIGS. 1 and 2, a pen enclosure 100 is provided at the end of the hut structure 10 opposite the pivotal connection between the hut structure and the floor 26. The enclosure 100 includes a wire fence 102 connected to a concrete floor 104 having upstanding side curbs 106. A waste gutter may also be provided at the end of the pen 100 opposite the hut structure 10 and may be in communication with a series of farrowing huts positioned in side-by-side relation such that waste materials from each of the farrowing huts will be fed into a common waste gutter 108. The farrowing hut and the pen 100 are sloped toward the waste gutter 108 by being placed on gravel which diminishes in thickness towards the waste gutter 108.

An alternate embodiment is illustrated in FIGS. 4 and 5 and is better suited for being moved about from one area to another since the pen enclosure 100A includes a floor 104A of fiberglass material fastened to the fiberglass floor 26A of the hut structure 10A by bolts 120. A wire fence 122 extends around the floor 104A and provides a feeding and exercise area for the sow and pigs. A watering trough 124 is provided in the pen enclosure 100A. The hut floor portions 26A and 26B in the pig sections also include heating elements as illustrated in FIG. 6 for heating the pig sections.

It is thus seen that a farrowing hut is provided that is substantially disease free from one litter to the next by virtue of the fact that non-porous materials are used in the construction of the hut such that bacteria will not be absorbed into the material and retained for exposing subsequent litters to disease. The hut may be pivoted to an open position and washed down followed by allowing the sun to kill any bacteria that might remain, particularly on the floor of the hut. The huts being outside completely isolate one litter from another whereby no two litters are breathing the same air such that if one litter has some disease it will not be communicated to the next litter.

I claim:

1. A swine farrowing hut comprising, a hut structure including a floor and an enclosure of non-porous material which bacteria cannot penetrate and having a center sow section and oppositely disposed side pig sections and opposite end walls, said floor including oppositely disposed floor portions under each of said oppositely disposed side pig sections and said floor portions containing heating means for heating said side pig sections only whereby pigs will be attracted to the side sections from the center section where the sow cannot lie on the pigs and injure them, and pivot means connecting said floor to one of said end walls for pivoting said hut structure from a lowered position extending over said floor to a raised open ended position off said floor fully exposing said floor and the interior of said hut structure to the sun and atmosphere with said one end wall of said hut structure engaging the ground adjacent said floor.

2. The structure of claim 1 and an open top pen enclosure is connected to the end of said hut structure opposite the pivot means connecting said hut structure to said floor and said other end wall of said hut structure has an animal passageway opening connecting said center section of said hut structure with said pen enclosure and said pen enclosure includes a non-porous floor which bacteria cannot penetrate.

3. The structure of claim 2 wherein a waste gutter is integrally connected to said pen enclosure at the end opposite said hut structure and said floor of said hut structure slopes towards said pen enclosure and a floor in said pen enclosure slopes towards said waste gutter whereby waste materials in said hut structure and pen enclosure naturally gravitate toward said waste gutter.

4. The structure of claim 2 wherein said hut and floor in said pen enclosure are fabricated from fiberglass material.

5. The structure of claim 1 wherein vertically disposed wind screens are provided between said center sow section and each of said side pig sections to restrict and limit wind entering said side pig sections.

6. The structure of claim 1 and a feeder unit is provided on an end wall in the center section of said hut structure and is provided with pig feed openings accessible from the inside of said hut structure in the center section.

7. The structure of claim 6 wherein said feeder unit is further defined as being mounted on a removable door in the associated end wall of said hut structure.

8. The structure of claim 1 and a feeder unit is provided in said pig sections on an exterior side wall with feed openings accessible only from within said side sections whereby pigs only may feed at said feeder unit.

9. The structure of claim 8 wherein said exterior side wall includes an access opening adjacent to said feeder unit and said feeder unit includes a fill opening closely adjacent said access opening for filling said feeder unit from the exterior of said hut structure.

* * * * *